United States Patent [19]

Stoppani et al.

[11] 4,098,396
[45] Jul. 4, 1978

[54] CONVEYOR JOINT

[75] Inventors: Brian Raymond Stoppani; Nigel John Box, both of Doncaster, Great Britain

[73] Assignee: Mining Supplies Limited, England

[21] Appl. No.: 749,775

[22] Filed: Dec. 13, 1976

[51] Int. Cl.² ............................................. B65G 19/28
[52] U.S. Cl. .................................. 198/861; 198/735; 403/317; 403/337
[58] Field of Search ........................ 198/735, 861, 860; 403/316, 317, 335, 337

[56] References Cited

U.S. PATENT DOCUMENTS

| 3,583,552 | 6/1971 | Renwick | 198/735 |
| 3,944,061 | 3/1976 | Braun et al. | 198/861 |

FOREIGN PATENT DOCUMENTS

| 893,327 | 10/1953 | Fed. Rep. of Germany | 198/860 |
| 958,559 | 5/1964 | United Kingdom | 198/735 |

*Primary Examiner*—Bruce H. Stoner, Jr.
*Assistant Examiner*—Jeffrey V. Nase
*Attorney, Agent, or Firm*—Olson, Trexler, Wolters, Bushnell & Fosse, Ltd.

[57] ABSTRACT

A joint for connecting together adjacent ends of individual elongate pans of an armoured scraper chain conveyor, has the adjacent conveyor pan ends provided on the outsides of their sidewalls with interengaging male and female formations, each formation being provided with one or more abutment surfaces forming part of a laterally open pocket connected to a laterally open channel, the pocket and channel of adjacent pan ends receiving a common, laterally inserted connector having a shank portion located within respective channels and at each end of the shank portion an enlarged head located within respective pockets so as to be engageable with an abutment surface of a respective pocket, and an aperture provided in the shank portion to receive a locating pin restrained from lateral displacement by engagement with a projection of one or other of the formations.

13 Claims, 9 Drawing Figures

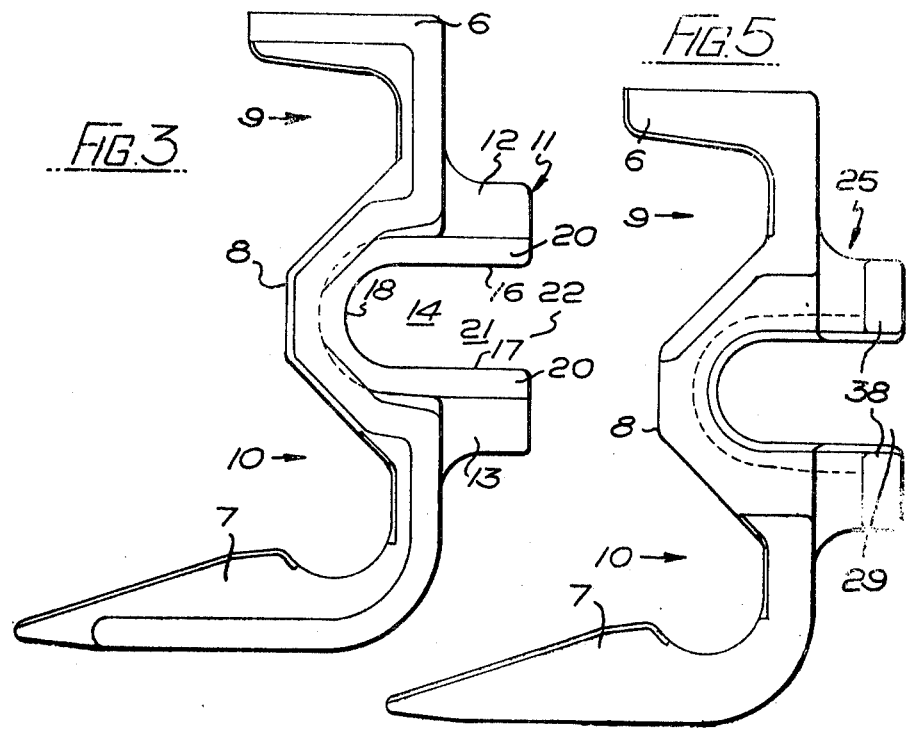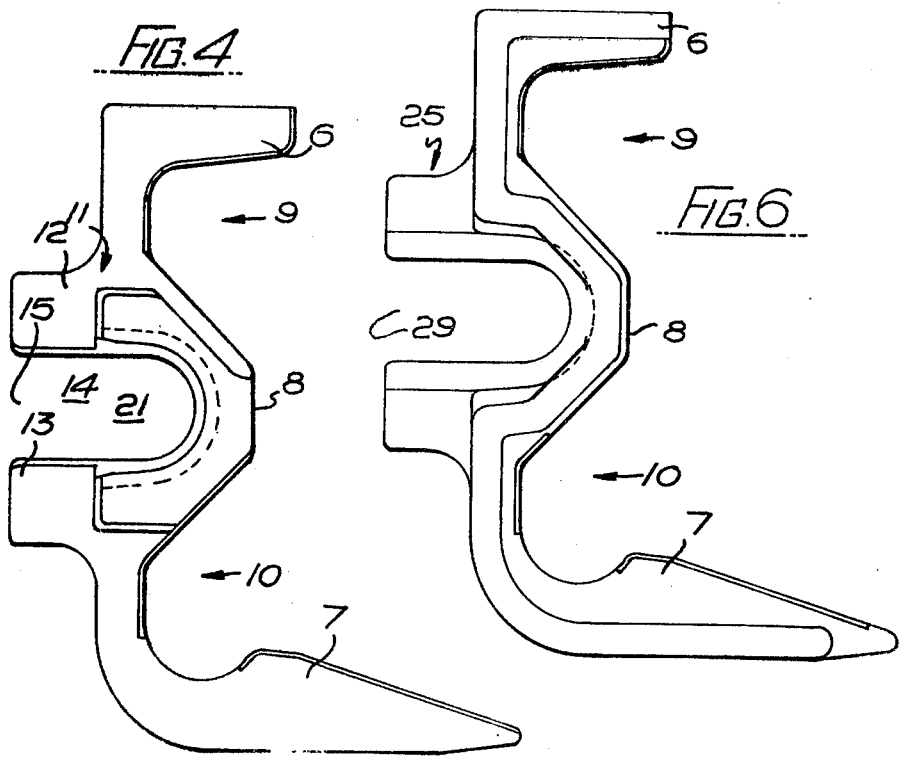

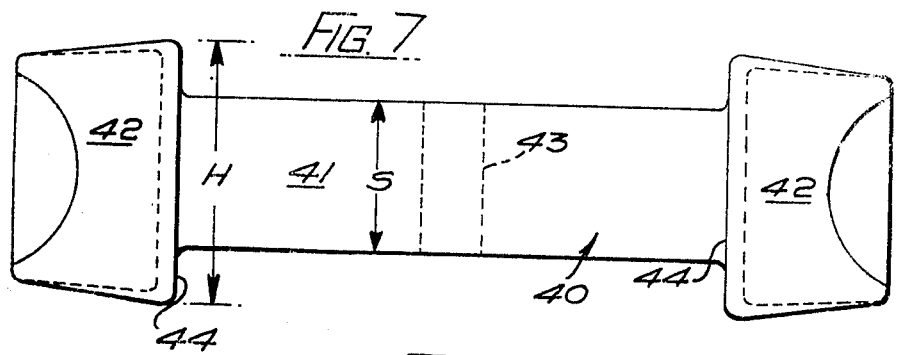
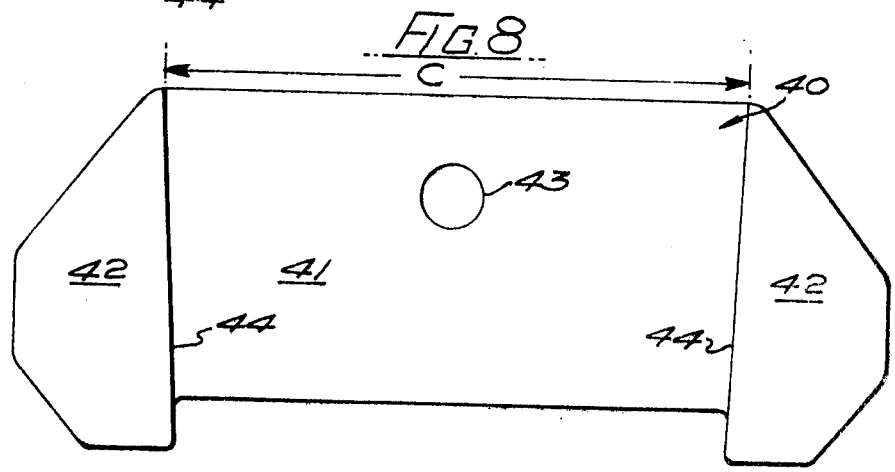
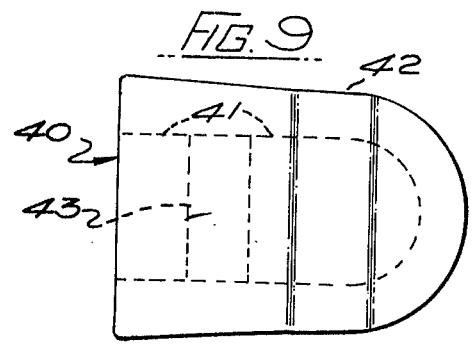

CONVEYOR JOINT

This invention relates to joints for armoured scraper chain conveyors and to conveyors incorporating such joints.

Such conveyors, whether of the double or single strand type, are used extensively in coal mining operations and it is necessary to joint together a plurality of individual pans in end-to-end relationship at each side thereof, in order to build up a conveyor of the desired length. Such length may for instance be 250 yards with the individual pans of five feet length. Each pan comprises a pair of spaced apart, mutually facing, sigma section sidewalls jointed by a deckplate which separates an upper conveying run, from a lower return run. During the necessary advance of the conveyor to follow the newly exposed coal face, the individual pans are snaked forward in the well known manner, which necessitates articulation at the joints between adjacent pans, such joints providing for articulation not only in a horizontal plane to accommodate the snaking effect, but also in a vertical plane to accommodate unevenness of the mine floor. Conventionally these joints comprise male and female formations at adjacent ends of the pans, through which ends a common connecting bolt is passed to define the maximum permitted opening of the joint at that respective side of the conveyor. It will be appreciated that under mining conditions removal and/or replacement of a bolt is relatively difficult, while limitations on the tensile load which may be placed on the conveyor in its longitudinal direction are provided by the bolt cross-sectional areas which it is possible to employ. Such tensile loading of the conveyor is of increasing inportance with the trend towards the use of mining machines which haul themselves to and fro along the coal face by engaging projections of the conveyor i.e., operating by the so-called chainless haulage system.

According to the present invention a joint for connecting together adjacent ends of individual elongate pans of an armoured scraper chain conveyor, has the adjacent conveyor pan ends provided on the outsides of their sidewalls with interengaging male and female formations, each formation being provided with one or more abutment surfaces forming part of a laterally open pocket connected to a laterally open channel, the pocket and channel of adjacent pan ends receiving a common, laterally inserted connector having a shank portion located within respective channels and at each end of the shank portion an enlarged head located within respective pockets so as to be engageable with an abutment surface of a respective pocket, and an aperture provided in the shank portion to receive a locating pin restrained from lateral displacement by engagement with a projection of one or other of the formations.

The invention also includes a scraper chain conveyor comprising a plurality of individual pans connected together by joints as defined above.

Thus to assemble such a joint, the male and female formations are inter-engaged, the connector is laterally inserted so as to locate the heads in the pockets and the locating pin is then passed through the aperture in the shank. The distance between the respective heads of the connector dictates the maximum distance between the abutment surfaces and hence the maximum opening permitted of the joint, to give joint articulation in a generally horizontal plane. Although articulation in a general vertical plane can be provided by suitably arranging the tolerances between the thickness of the shank portion of the connector and the corresponding dimension of the channels, preferably the latter on at least one formation is outwardly flared towards the other formation from the region adjacent the abutment surface. Another preferred feature is to increase the articulation possible in the horizontal plane by flaring inwardly a rear face of the channel of at least one formation.

Although conveyor pans could be connected at only one sidewall by joints in accordance with the invention, with the other side connected by a conventional joint which would prove adequate in that a modern chainless haulage arrangement for a mining machine drives from one side only of the conveyor along which side the joint in accordance with the invention could be arranged, preferably both sides of each pan of the conveyor are provided with joints in accordance with the invention.

Although each of the interengaging formations could be mounted by welding to the outsides of the respective pan sidewalls the formations are preferably produced integrally with the sidewalls by casting. Thus, the formations may be produced on respective end pieces which correspond to the cross sectional shape of a pan sidewall and are adapted to be welded to the end of a pan.

Each formation may comprise basically two spaced, parallel ribs extending in the longitudinal direction of the conveyor, the spacing defining the channel and the ribs being stepped outwardly, at a distance spaced from the end of the pan, to form a shoulder constituting the abutment surface. Interengagement is provided by forming a blind receiving hole in or at the ribs of one pan, and a projection to fit such hole constituted by the ribs of the adjacent pan extending beyond the pan end.

The projection to restrain the locating arm pin may comprise a nose extending in the longitudinal direction of the pan from one formation toward the adjacent formation of an adjacent pan, such nose defining an aperture of greater cross sectional area than that of the locating pin. Preferably the nose is formed on the female formation, and preferably each rib carries a nose to restrain the locating pin from both above and below the connector, the connecting pin being a force fit in the hole of the connector shank.

The invention will now be described in greater detail by way of example with reference to the accompanying drawings, in which:

FIG. 3 is an end view in the direction of arrow A of FIG. 1 of the male formation;

FIG. 4 is an end view in the direction of arrow B of FIG. 1 of the male formation;

FIG. 5 is an end view in the direction of arrow C of FIG. 1 of the female formation;

FIG. 6 is an end view in the direction of arrow D of FIG. 1 of the female formation;

FIG. 7 is a front elevation of the connector;

FIG. 8 is a plan view of FIG. 7; and

FIG. 9 is an end elevation of FIG. 7.

Figure 1:
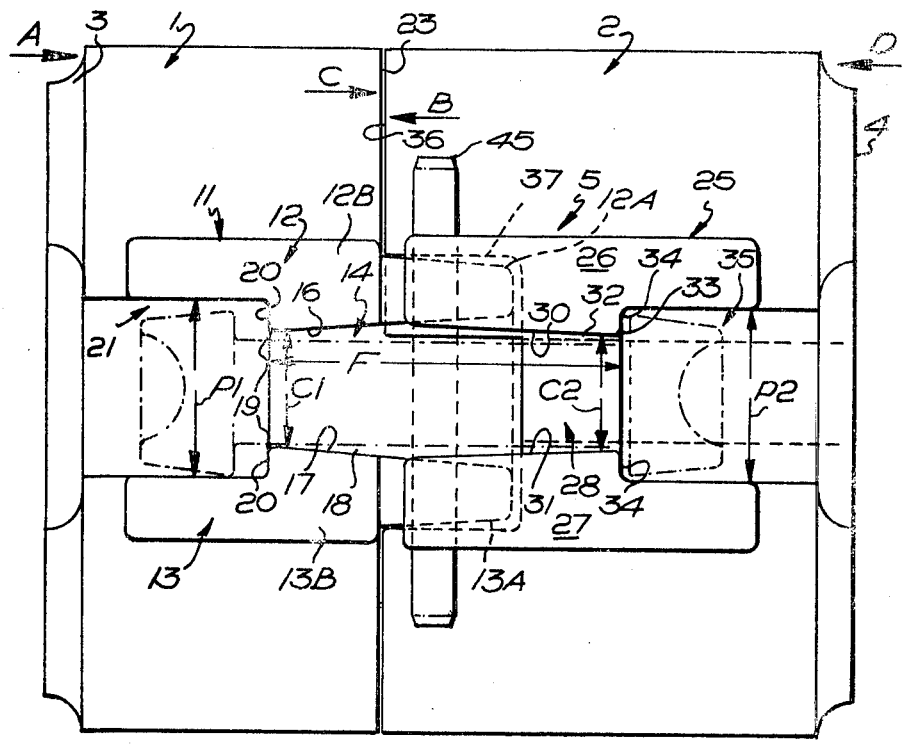
FIG. 1 is a side elevation of a joint in accordance with the invention.

In the drawings, adjacent end pieces 1, 2, formed as castings, are adapted to be secured by welding along respective connecting edges 3, 4 to adjacent ends of adjacent, elongate conveyor pans (not shown) to form part of a joint 5. In this respect, each end piece 1, 2 corresponds in cross-section to a conventional sigma section sidewall of a conveyor pan and hence comprises a head rail 6 on which a mining machine is usually supported and guided via slide shoes or rollers, a foot 7 to seat on a floor and an interposed longitudinally extending face 8 to which is welded a planar deck plate (not shown) to separate an upper, conveying run 9 of the conveyor from a lower, return run 10.

The end piece 1 carries an integral male formation 11 comprising upper and lower parallel ribs 12 and 13 respectively, which ribs are spaced apart to define a channel 14 having a lateral opening 15 (FIG. 4) and top, bottom and rear faces 16, 17 and 18 each of which is flared outwardly from a step 19 which provides an abutment surface 20 at an enlarged pocket 21 which is a continuation of the channel 11, the pocket 21 having a lateral opening 22 (FIG. 3). The pocket 21 also has a vertical dimension P1 greater than the corresponding dimension C1 of any portion of the channel 14. The end piece 1 has an end face 23 and portions 12A and 13A of the ribs 12 and 13 project beyond the end face, while other portions 12B, 13B form lateral projections to provide a closure face 24.

The end piece 2 carries an integral female formation 25 comprising upper and lower parallel ribs 26 and 27 respectively, which ribs are spaced apart to define a channel 28 having a lateral opening 29 (FIG. 5) and divergent top and bottom faces 30, 31 joined by an orthogonal rear face 32, these faces having a step 33 which provides an abutment surface 34 at an enlarged pocket 35 also having a vertical dimension P2 greater than the corresponding dimension C2 of any portion of the channel 28. The end piece 2 has an end face 36 and adjacent this face the female formation 25 is provided with a blind hole 37 of sufficient dimension to receive the projecting portions 12A, 13A. From each rib 26, 27 of the female formation 25 extends a nose 38 which with the closure face 24 defines an aperture 39.

A connector 40 comprises a shank portion 41 and at each end thereof an enlarged head 42, the shank having a hole 43, a vertical dimension S less than the channel dimension C1 and C2 and the heads having a vertical dimension H less than the pocket dimensions P1 and P2, and each head having an engagement shoulder 44 inclined with respect to the longitudinal axis of the connector 40.

Figure 2:
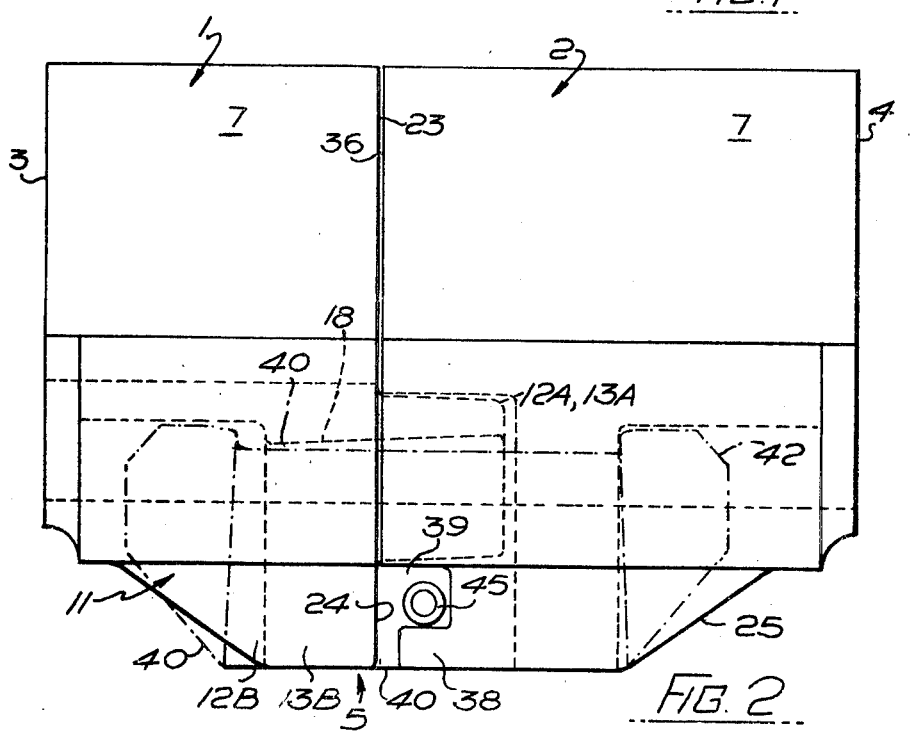
FIG. 2 is a plan view of the joint of FIG. 1.

To assemble the joint 5 of FIGS. 1 and 2, the faces 23 and 36 are brought into close proximity, the closest possible being shown in these Figures, with the male and female formations 11 and 25 interengaged. The connector 40 is then inserted into the channels 14 and 28 and pockets 21 and 35 and a locating pin 45, of smaller cross-sectional area than apertures 39, is passed through the upper aperture 39, forced through the shank hole 43 and its lower end passed through the lower aperture 39, to attain the joint position shown in FIGS. 1 and 2. In this condition the distance F between the abutment surfaces of the formations is of course less than the maximum distance C between the engagement shoulders 44 of the connector, the distance C determining the maximum opening possible of the joint 5 by the faces 23 and 36 parting which occurs when the conveyor is snaking over in the conventional manner in the course of being advanced, and the inclination of the shoulders 44 ensuring that at the maximum angle of snake e.g. 3°, when the maximum load is applied to the connector 40, the shoulders 44 make face contact with the respective abutment surfaces. Articulation of the joint 5 in a horizontal plane is ensured by the clearance provided by the rear face 18, as best seen in FIG. 2, while articulation in a vertical plane is provided by the similar clearance from faces 16, 17, 30 and 31, as best seen in FIG. 1.

What I claim is:

1. A joint for connecting together adjacent ends of individual elongate pans of an armoured scraper chain conveyor, said joint comprising adjacent conveyor pan end piece formations provided on the exterior of adjacent sidewall surfaces of said pans, said end piece formations including interengaging male and female formations having overlapped segments thereof, each formation being provided with one or more abutment surfaces forming part of a laterally open pocket connected to a laterally open channel, a common laterally inserted connector received in said pocket and channel of the adjacent end piece formations, said connector having a shank located within respective channels and at each end of said shank an enlarged head located within respective pockets so as to be engageable with an abutment surface of a respective pocket, thereby to prevent longitudinal separation of said adjacent elongate pans while providing for articulated movement therebetween, said shank having a portion disposed laterally beyond said overlapped segments of said male and female formations, and pin means extending generally transverse from said laterally disposed shank portion, and projection means on at least one of said male or female formations also disposed laterally beyond said overlapped segments, and embracing said pin means to restrain said connector from lateral displacement with respect to said pocket, thereby to maintain said connector disposed within said channels and pockets, such that said pin means does not interconnect said overlapped segments, which would unduly restrict the relative longitudinal movement of said formations.

2. A joint as claimed in claim 1, wherein said channel of at least one formation is outwardly flared towards said other formation from a region adjacent said abutment surface.

3. A joint as claimed in claim 2, wherein a rear face of said channel of at least one formation is flared inwardly.

4. A joint as claimed in claim 1, provided at both sides of a conveyor pan.

5. A joint as claimed in claim 1, wherein said interengaging formations are welded to said outsides of respective pan sidewalls.

6. A joint as claimed in claim 1, wherein said interengaging formations are formed integrally with said sidewalls, by casting.

7. A joint as claimed in claim 1, wherein said interengaging formations are produced on respective end pieces which correspond to the cross-sectional shape of a pan sidewall and are adapted to be welded to the end of a pan.

8. A joint as claimed in claim 1, wherein each of said formations comprises basically two spaced, parallel ribs extending in the longitudinal direction of said conveyor, said spacing defining said channel and said ribs being stepped mutually outwardly, at a distance spaced from the end of said pan, to form a shoulder constituting said abutment surface.

9. A joint as claimed in claim 8, wherein interengagement is provided by forming a blind receiving hole in or at said ribs of one pan, and a projection to fit such hole constituted by said ribs of said adjacent pan extending beyond said end of said adjacent pan.

10. A joint as claimed in claim 8, wherein each of said ribs on one of said formations carries a nose to restrain said locating pin from both above and below said connector.

11. A joint as claimed in claim 1, wherein said projection to restrain said pin means comprises a nose extending in the longitudinal direction of the pan from one of said formations toward said other adjacent formation of an adjacent pan, such nose defining an aperture of greater cross-sectional area than that of said locating pin.

12. A joint as claimed in claim 11, wherein said nose is formed on said female formation.

13. A joint as defined in claim 1, wherein said connector includes an aperture formed in the shank portion thereof, and said pin means is provided by a locating pin removably disposed in said aperture.

* * * * *